United States Patent [19]

Masuda

[11] Patent Number: 5,440,083
[45] Date of Patent: Aug. 8, 1995

[54] EXHAUST MUFFLER FOR INTERNAL COMBUSTION ENGINE

[75] Inventor: Isao Masuda, Tokyo, Japan

[73] Assignee: Kioritz Corporation, Tokyo, Japan

[21] Appl. No.: 198,544

[22] Filed: Feb. 18, 1994

Related U.S. Application Data

[63] Continuation of Ser. No. 12,891, Feb. 3, 1993, abandoned.

[30] Foreign Application Priority Data

Feb. 10, 1992 [JP] Japan .................. 4-13391 U

[51] Int. Cl.⁶ .................. F01N 7/10; F01N 7/18
[52] U.S. Cl. .................. 181/240; 181/258; 181/282
[58] Field of Search ............. 181/232, 240, 243, 258, 181/282; 60/288, 289, 299; 422/180

[56] References Cited

U.S. PATENT DOCUMENTS

| 4,105,090 | 8/1978 | Tachibana et al. | 181/282 X |
| 4,370,855 | 2/1983 | Tuggle | 181/240 X |
| 4,418,790 | 12/1983 | Agnew | 181/140 |
| 4,867,270 | 9/1989 | Wissmann | 181/231 |
| 4,890,690 | 1/1990 | Fischer et al. | 181/240 |
| 5,048,290 | 9/1991 | Lavenius et al. | 181/240 X |
| 5,139,107 | 8/1992 | Nagai | 181/140 |

Primary Examiner—Michael L. Gellner
Assistant Examiner—Eddie C. Lee
Attorney, Agent, or Firm—Bauer & Schaffer

[57] ABSTRACT

An exhaust muffler of this invention is constituted of a muffler main body having an opening, a muffler cover closing this opening of said muffler main body and being capable of attachment and removal, a partition separating said muffler main body and said muffler cover, and a long exhaust extension pass formed by combination of said partition and said muffler cover and extending by meandering in said muffler cover. On said partition, a communicating hole is provided to communicate between said muffler main body side and said muffler cover side. A catalyst is provided on the surface of said partition facing said muffler main body to purify exhaust gas. Thus, exhaust gas introduced into said muffler main body flows into the space formed by said muffler cover through said communicating hole after purified by said catalyst. This exhaust gas passes meandering through said exhaust extension pass during which exhaust gas is sufficiently cooled down and then discharged into atmosphere.

4 Claims, 2 Drawing Sheets

EXHAUST MUFFLER FOR INTERNAL COMBUSTION ENGINE

This is a continuation of Ser. No. 08/012,891, filed Feb. 3, 1993, now abandoned.

BACKGROUND OF THE INVENTION

This invention relates to an exhaust muffler for an internal combustion engine. The exhaust muffler of this invention can be applied to such internal combustion engine as an air-cooled two cycle gasoline engine and the like which is used for a portable working machine such as a brush cutter, chain saw and the like.

In the internal combustion engine as described above, exhaust gas is introduced into an exhaust muffler through an exhaust port of a cylinder, hazardous substances in exhaust gas are removed from exhaust gas and noise is reduced in the exhaust muffler, and then exhaust gas is discharged into atmosphere.

High decontamination efficiency of exhaust gas is required for such exhaust muffler as mentioned above. Particularly, in such internal combustion engine as an air-cooled two cycle gasoline engine and the like mounted on a working machine which is used with carrying by worker on or close to his body, reduction of hydrocarbon (HC), carbon monoxide (CO) and the like in exhaust gas is strongly required and also subjected to the legal restriction to protect worker's health.

Therefore, in order to improve the decontamination efficiency of exhaust gas, exhaust mufflers with following structure have been proposed.

For example, there is an exhaust muffler with structure inside of which provided with oxidation catalyst to reduce the content of hazardous substances such as HC, CO and the like in exhaust gas.

Another example of conventional exhaust muffler is structured to re-combust exhaust gas in the exhaust muffler by re-ignition on it discharged from the cylinder.

However, the size of exhaust muffler attached to the conventional portable working machine as mentioned above is small. Therefore, even though catalyst is provided in the exhaust muffler, the decontamination efficiency of exhaust gas by the catalyst was low due to smaller contact area of the catalyst with exhaust gas. In addition, if exhaust gas is re-combusted in the exhaust muffler, temperature of the surface of the exhaust muffler and of exhaust gas discharged to atmosphere through the exhaust muffler is risen up due to smaller size of the exhaust muffler, resulting in increased damage of the exhaust muffler and causing the hazard to worker being accidentally burnt during work carrying with it. Furthermore, it takes much trouble to change or maintain the catalyst.

SUMMARY OF THE INVENTION

The object of this invention was made to solve such problems as mentioned above.

The first object of this invention is to provide an exhaust muffler with high purification efficiency of exhaust gas even though the size of the exhaust muffler is reduced.

The second object of this invention is to provide an exhaust muffler which can inhibit the rising of surface temperature and discharge exhaust gas with lower temperature even though the size of the exhaust muffler is reduced.

The third object of this invention is to provide an exhaust muffler with lower noise level.

Furthermore, the forth object of this invention is to provide an exhaust muffler which facilitates change and maintenance of the catalyst.

In order to accomplish the above objects, this invention is constituted of a main body of a muffler having an opening on one side thereof, a muffler cover which closes said opening on said muffler main body and is capable of attachment and removal, a partition held between said muffler cover and said muffler main body, a catalyst for purification of exhaust gas provided on the surface of said partition facing said muffler main body, an exhaust extension pass formed the inside of said muffler cover by the combination of said muffler cover and said partition, a communicating hole provided on said partition and communicating between the inside of said muffler main body and the inside of said muffler cover, a cooling fin provided on the outer surface of said muffler cover, and an exhaust port provided on said muffler cover and discharging exhaust gas passed through said exhaust extension pass into atmosphere.

According to this invention constituted as mentioned above, exhaust gas discharged from a cylinder of an engine contacts with and is purified by the catalyst in the muffler main body. And, exhaust gas purified by the catalyst flows into the inside of the muffler cover through the communicating hole provided on the partition, passes through the exhaust extension pass formed by combination of the muffler cover and the partition and is discharged through the exhaust port into atmosphere.

In this invention, it is feasible to constitute the exhaust extension pass with longer distance and possible to effectively reduce temperature of exhaust gas passing through the exhaust extension pass and further improve the efficiency for reduction of noise by the cooling fin provided on the surface of the muffler cover.

It is also feasible to further improve said cooling effect by delivering a part of cooling air of engine to the part of the cooling fin.

As mentioned above, according to this invention it is possible to effectively reduce temperature of the surface of the exhaust muffler and of exhaust gas discharged from the exhaust muffler as well as to reduce the content of hazardous substances in exhaust gas. Furthermore, it is possible to further reduce the level of noise generated by the engine.

In addition, the decontamination efficiency of exhaust gas is quite good because the catalyst can be provided on almost whole surface of the partition facing the muffler main body. Change and maintenance of the catalyst is also quite easy because the muffler cover and the partition are capable of attachment and removal.

DETAILED DESCRIPTION OF THE INVENTION

Followings are detailed description of an embodiment of this invention based on the drawings.

Figure 1:
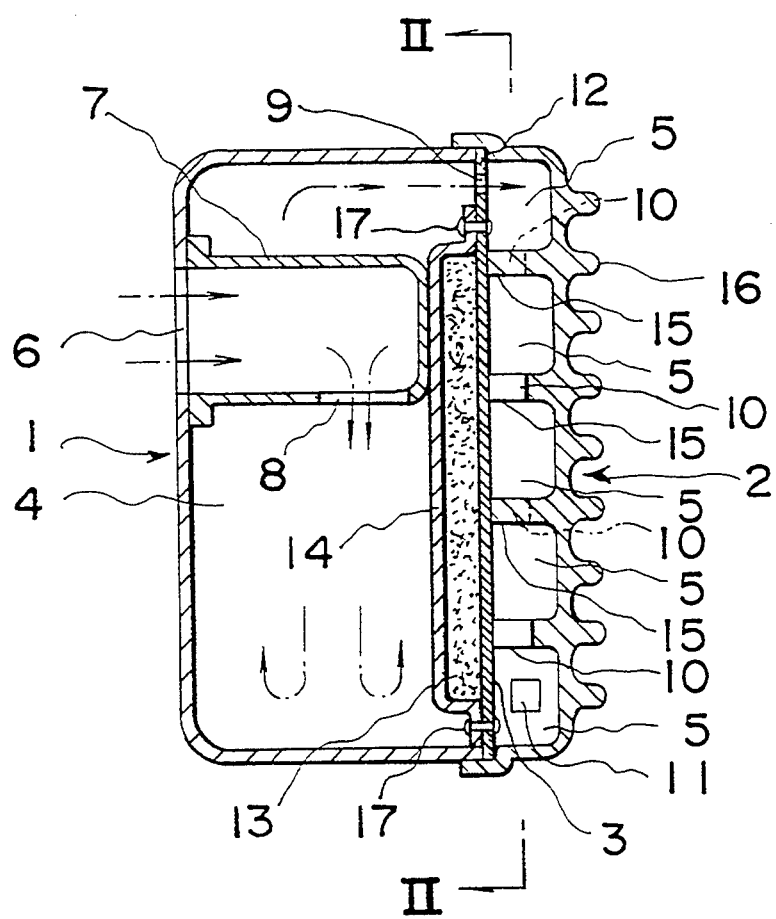
FIG. 1 is a sectional view (a cross sectional view along line I—I in FIG. 2) showing an exhaust muffler related to an embodiment of this invention.
Figure 2:
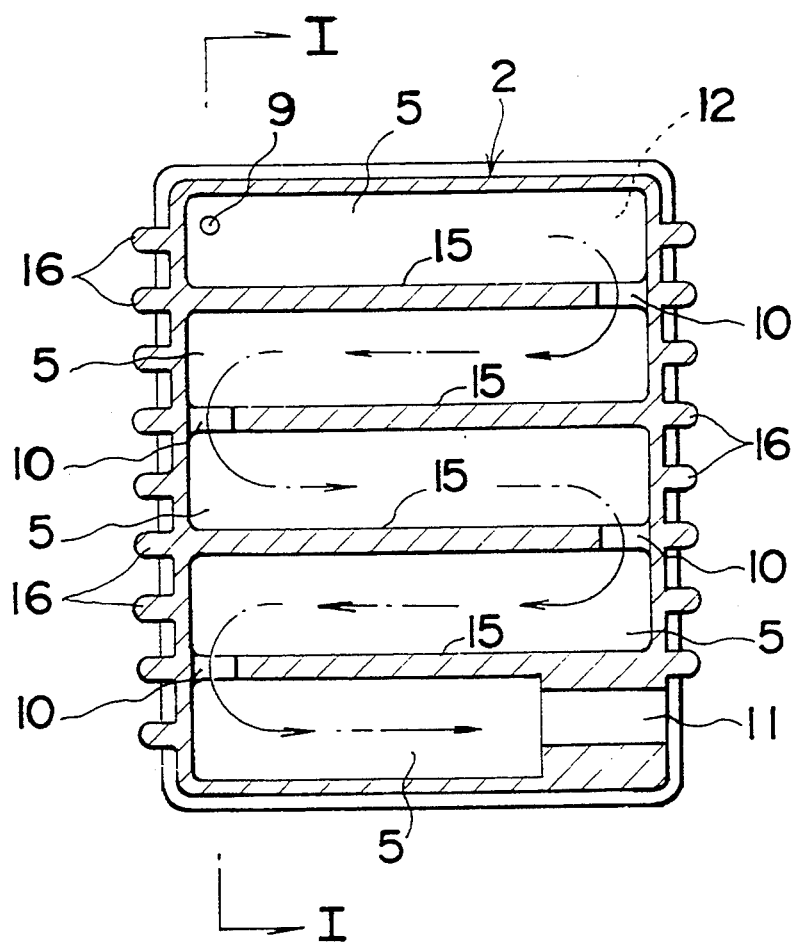
FIG. 2 is a cross sectional view along line II—II in FIG. 1.

FIG. 1 is an overall outline of sectional view (a cross sectional view along line I—I in FIG. 2) and FIG. 2 is a cross sectional view along line II—II in FIG. 1 showing an exhaust muffler related to an embodiment of this invention.

An exhaust muffler shown in the drawings is constituted of, a box type muffler main body 1 having an opening part 12 on one side, a muffler cover 2 closing the opening part 12 on the muffler main body 1, and a partition 3 separating between the muffler main body 1 and the muffler cover 2. And an exhaust gas introducing space 4 is formed in the muffler main body 1 by the muffler main body 1 and the partition 3. An exhaust extension pass 5 meandering inside the muffler cover 2 is also formed by the muffler cover 2 and the partition 3.

At an appropriate position on the upper side of the muffler main body 1, an exhaust gas inlet 6 is provided. Exhaust gas discharged from an internal combustion engine such as an air-cooled two cycle gasoline engine and the like (not shown in drawings) is introduced into the muffler main body 1 through the exhaust gas inlet 6.

In the muffler main body 1, a tube 7 is provided horizontally of which opening part is connected to the exhaust gas inlet 6 and another part is closed on this tube 7, a discharge port 8 is provided downwards. The discharge port 8 is provided on the closer position to a catalyst 13 so that exhaust gas can flow alongside said catalyst 13. Exhaust gas discharged from the internal combustion engine flows into the tube 7 through exhaust gas inlet 6 and then into the muffler main body 1 through the discharge port 8 alongside the catalyst 13.

The tube 7 is provided to facilitate the contact of exhaust gas with the catalyst 13 more efficiently by restricting exhaust gas, which introduced into the muffler main body 1 through the exhaust gas inlet 6, to flow alongside the catalyst 13.

Said partition 3 is held between the muffler main body 1 and the muffler cover 2 and constituted of a proper heat insulating material.

At an appropriate upper position of the partition 3, a hole through the partition 3 is provided. This hole is communicating hole 9 connecting said exhaust gas introducing space 4 in the side of the muffler main body 1 and the upper part of said exhaust extension pass 5 in the side of the muffler cover 2.

Moreover, the catalyst 13 is provided on almost whole surface of the partition 3 facing the exhaust gas introducing space 4 to decontaminate exhaust gas. This catalyst 13 is constituted of, heat insulating and acoustic material such as ceramic wool and the like, and cross catalyst and the like. The catalyst 13 is enclosed with the partition 3 and a holding material 14 constituted of porous metallic plate, wire mesh and the like having gas permeability. That is, the holding material 14 is fixed on the partition 3 through screw threads 17 and the like to hold the catalyst 13 on the surface of the partition 3.

Next, said muffler cover 2 is described. The muffler cover 2 is capable of attachment to and removal from the muffler main body 1 and covers the opening part 12.

Inside the muffler cover 2, several partitioning walls 15 are provided to make an appropriate number of spaces between the muffler cover 2 and the partition 3. A vent hole 10 is provided on the edge of each partitioning wall 15 at alternative position. The partitioned space is connected each other through the vent hole 10 to form a meandering and longer exhaust extension pass 5 between said partition 3 and the muffler cover 2.

On the other hand, many cooling fins 16 are provided on the outer surface of the muffler cover 2 to increase cooling efficiency. An exhaust port 11, which connects to the downstream of said exhaust extension pass 5 and communicates the inside and the outside of the muffler cover 2, is provided on the lower part of the muffler cover 2.

The exhaust muffler constituted as mentioned above is in effect as follows.

Exhaust gas discharged from the cylinder of engine is supplied to the tube 7 through the exhaust gas inlet 6 of the muffler main body 1 and introduced into the exhaust gas introducing space 4 constituted of the muffler main body 1 and the partition 3 through the discharge port 8 provided on the tube 7.

Exhaust gas introduced into the exhaust gas introducing space 4 flows downwards alongside the surface of the porous holding material 14. Exhaust gas is then purified by contacting with the catalyst 13 held by the holding material 14. Consequently, exhaust gas flows into the inside of the muffler cover 2 through the communicating hole 9 provided on the upper part of the partition 3 and then flows into the long and meandering exhaust extension pass 5.

Exhaust gas flowed into the exhaust extension pass 5 flows meandering as shown by arrows in FIG. 2 and is finally discharged through the exhaust port 11 provided on the lower part of the muffler cover 2 into atmosphere.

As mentioned above, exhaust gas discharged from the cylinder is discharged into atmosphere after sufficiently purified, reduced in noise and cooled in the exhaust muffler.

In this invention, because the exhaust extension pass 5 was constituted to be a longer pass by meandering as mentioned above and many cooling fins 16 were provided on the outer surface of the muffler cover 2, it is possible to effectively reduce temperature of exhaust gas because heat held in exhaust gas is effectively dispersed through the cooling fins 16 while exhaust gas flows through the exhaust extension pass 5 and also to further reduce the noise.

In addition, the catalyst 13 was provided on almost whole surface of the partition 3 to purify exhaust gas, therefore the surface area of the catalyst 13 contacting with exhaust gas becomes larger, resulting in higher decontamination efficiency of exhaust gas.

Furthermore, because the muffler cover 2 is capable of attachment to and removal from the muffler main body 1, the partition 3 held between these is also capable of removal, therefore it is easy to clean and change said partition 3 and the catalyst 13 and maintenance of the exhaust muffler is also easy.

According to this invention, it is feasible to further reduce the content of hazardous substances in exhaust gas and it is also possible to obtain such effects as reduction of noise, easy change of the catalyst and the like and easy maintenance of the muffler because it is possible to effectively reduce temperature of the surface of the exhaust muffler and of exhaust gas.

What is claimed is:

1. An exhaust muffler for an internal combustion engine comprising a canister having a box-like body provided with an inlet port for exhaust gas on one side and being open on the opposite side, a cover having an outlet port open to atmosphere and being removably attached to said body to enclose said open side, a partition held between said body and said cover to define with said body a gas receiving chamber and with said cover a gas discharge chamber, said partition having a communicating hole remote from said inlet and outlet ports connecting said receiving chamber and said discharge chamber for the movement of gas from said inlet port to said outlet port, a catalyst mounted on one surface of said partition within said gas receiving chamber to purify said exhaust gas as said exhaust gas flows through said receiving chamber, and partitioning walls formed on at least the interior surface of said cover, said partitioning walls having offset vent holes to define within said gas discharge chamber a winding passage from said communicating hole to discharge outlet and fins formed on the exterior or said cover to cool the gas flowing therethrough prior to discharge to the atmosphere.

2. The muffler according to claim 1, wherein said partition is removably clamped between the peripheral edges of said body and cover.

3. The muffler according to claim 1, wherein said catalyst is in the form of a batt and is held on said partition by a foramens cover plate.

4. The muffler according to claim 1, including a tube mounted over the exhaust inlet port within said receiving chamber, having at least one opening adjacent said catalyst means to direct the exhaust gas into contact with said partition.

* * * * *